(12) United States Patent
Boudnik et al.

(10) Patent No.: US 7,191,362 B2
(45) Date of Patent: Mar. 13, 2007

(54) PARSING TEST RESULTS HAVING DIVERSE FORMATS

(75) Inventors: Konstantin I. Boudnik, Castro Valley, CA (US); Weiqiang Zhang, San Jose, CA (US); Alexei Volkov, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 529 days.

(21) Appl. No.: 10/241,022

(22) Filed: Sep. 10, 2002

(65) Prior Publication Data

US 2004/0049716 A1 Mar. 11, 2004

(51) Int. Cl.
*G06F 11/00* (2006.01)

(52) U.S. Cl. .......................... 714/33; 717/143
(58) Field of Classification Search .................. 714/33, 714/38, 45; 715/523, 530; 717/143
See application file for complete search history.

(56) References Cited

U.S. PATENT DOCUMENTS

2002/0078216 A1* 6/2002 Pankovcin et al. ......... 709/230
2002/0141449 A1* 10/2002 Johnson ....................... 370/473
2003/0131085 A1 7/2003 Zhang et al. ............... 709/223
2004/0205565 A1* 10/2004 Gupta ........................ 715/513

FOREIGN PATENT DOCUMENTS

GB 2 213 457 A 5/1997
WO WO 92/03782 10/1991

\* cited by examiner

*Primary Examiner*—Dieu-Minh Le
(74) *Attorney, Agent, or Firm*—Martine Penilla & Gencarella, LLP

(57) ABSTRACT

An invention is disclosed for providing methods for parsing test results having diverse formats. Test results from executed test suites are identified. Test result formats of the test results are categorized. An order of the test results is tracked. A chain of parsers is assembled from individual parsers such that each individual parser is charged with parsing a particular test result format. Test results are parsed such that the data features that define attributes of the test results are identified where the attributes define pass, fail, and comments associated with the pass or fail.

16 Claims, 6 Drawing Sheets

PARSING TEST RESULTS HAVING DIVERSE FORMATS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to software testing, and more particularly, to methods and systems for parsing test results having diverse formats.

2. Description of the Related Art

Software reliability through software testing continues to be very important in the software development cycle. As is well known, software testing is used to find and eliminate defects (i.e., bugs) in software, which if undetected, can cause the software to operate improperly. Software testing can be conducted by applying test harnesses to software products.

Generally speaking, test harnesses contain test suites. As used herein a test suite is a comprehensive list of test cases (TCs) or data files having commands specifically programmed to initiate a number of functional aspects of the software product being tested. For instance, if the software product being tested is a word processing program, the test suite may activate a spell check command, a cut text command, a paste command, etc. Thus, once the test suite is executed, the test results reveal whether any of the tested commands failed to operate as intended. Test cases can be in different formats. Also as used herein, once submitted for processing, each test case generates a test result. The corresponding test results will be in formats that correspond to that of the test case, and thus can vary across a series of test results. After the test results are generated they must be parsed. Individual parsers are formatted to parse a specific type of test result format. Therefore, it might not be possible to parse all test results with one parser.

Test harnesses can potentially contain more than one type of test case format in a test suite. Therefore, when a test harness is executed the test results will in many cases be of different formats. When parsing is performed on test results of different formats, multiple passes must be made with the different required parsers to parse all of the results. One pass must be made with each parser that corresponds to each different corresponding test result format. This need to perform a series of parsing operations to one set of data from a single test harness increases the time and decreases the efficiency of parsing.

When parsing is done on sets of test results from multiple test suites, each set of test results must be parsed separately, even if the test results across the two sets are all of the same format. The need to parse multiple times increases the time and decreases the efficiency of the parsing process.

In view of the foregoing, there is a need for more efficient systems and methods of parsing test results of diverse formats.

SUMMARY OF THE INVENTION

Broadly speaking, the present invention fills these needs by providing systems and methods for automatically parsing test results having diverse formats with parser chains. In one embodiment, a method for parsing test results having diverse formats is disclosed. Test results from executed test suites are identified. Test result formats of the test results are categorized. An order of the test results is tracked. A chain of parsers is assembled from individual parsers such that each individual parser is charged with parsing a particular test result format. Test results are parsed such that the data features that define attributes of the test results are identified where the attributes define pass, fail, and comments associated with the pass or fail.

In another embodiment, a method for parsing test results having diverse formats is disclosed. Test harnesses containing test cases are identified. Test results associated with each test harness are generated. Test result formats of the test results are determined. The test result format types are categorized. A chain of parsers is linked and assembled with a universal interface. The chain contains individual parsers where each individual parser is charged with parsing a particular test result format. The individual parsers are obtained from a parser repository. Test results are parsed.

A computer program embodied on a computer readable medium for parsing test results having diverse formats is disclosed in a further embodiment of the present invention. The computer program includes a code segment that identifies test results from executed test suites. In addition, a code segment is included that categorizes test result formats of the test results for parsing and presentation of test results in a unifying test result format. In addition, a code segment is included that tracks an order of test results. The system further includes a code segment that assembles a chain of parsers corresponding to the test results. The system further includes a code segment that links a chain of parsers, corresponding to the test results, with a universal interface. The system further includes a code segment that applies the chain of parsers to the test results. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
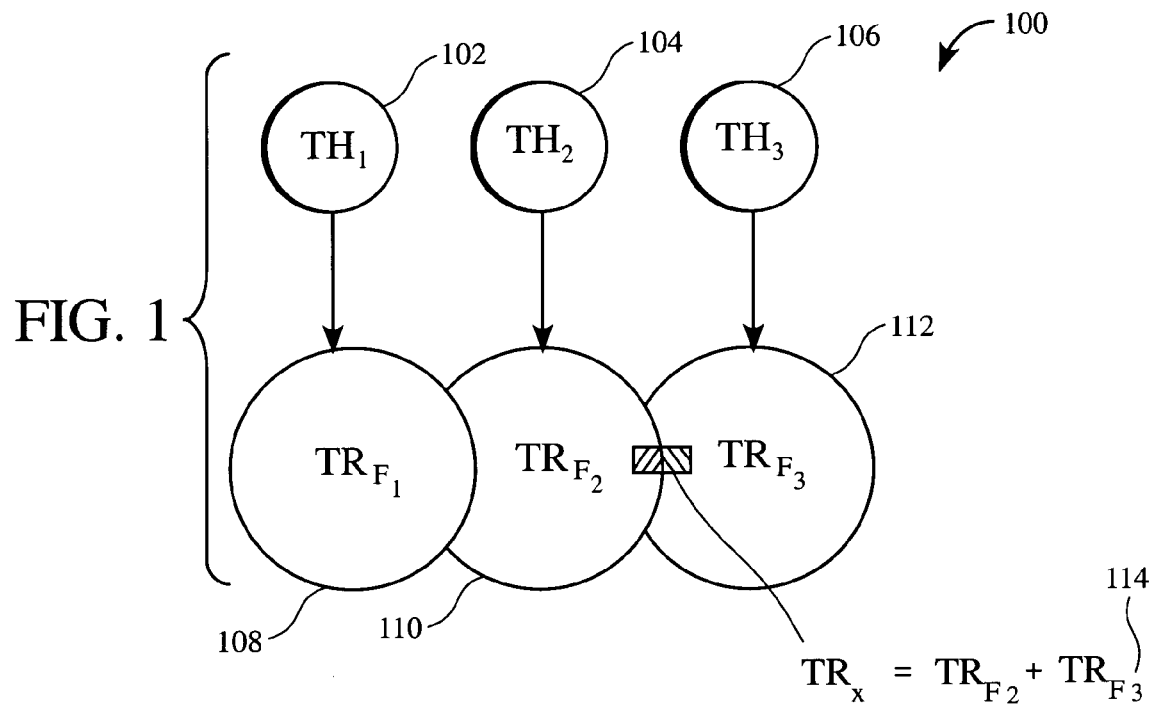
FIG. 1 is a block diagram illustrating a set of test harnesses and test results, in accordance with one embodiment of the present invention.

An invention is disclosed for the parsing of test results across multiple test suites or harnesses. Embodiments of the present invention allow parsing of test results of different formats with one universal harness-interchangeable results processing unit. The embodiments of the present invention therefore allow enhanced test execution management. In particular, embodiments of the present invention allow test applications to parse one set of test results that may come from multiple diverse environments, which therefore allows more efficient test results processing. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As embodiments of the present invention can implement Java technology, a brief introduction to Java is provided below. Nevertheless, this brief introduction to Java should not be considered as limiting as Java technology is well known by those skilled in the art. An overview of Java is provided below. Java™ (hereinafter "Java") is a programming language. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium, and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Extensible Markup Language (XML) is an open standard for describing data from the World Wide Web Consortium. It is used to define elements (what the element contains) on a Web page and business-to-business documents. XML allows tags to be defined by the developer of the page. So Web page elements can be identified and thus function like database records. XML Style sheet language: Transformations (XSLT) is a language that is used to convert an XML document into another XML document or into HTML, PDF or some other format. It is used often used to convert XML to HTML for screen display.

Keeping this brief overview of Java and software as it relates to the embodiments of the present invention in mind, reference is now made to FIG. 1 illustrating a block diagram of a set of test harnesses and test results, in accordance with one embodiment of the present invention. Generally speaking in software environments test results are made up of data features that define attributes of the test results. In one example, attributes define pass or fail and may have comments associated with them. The comments may, for instance provide further details of why a process generated a certain result or failed in some way. Test results of different formats may have different definitions for each format. For example, "select an icon" function may be defined as a different function name, but will still perform the same functional action. Therefore, test results of different formats will need different types of parsers that understand the meaning of each function and form the result will generate.

As shown, physically, system 100 includes three test harnesses: (1) test harness 1 ($TH_1$) 102, (2) test harness 2 ($TH_2$) 104, and (3) test harness 3 ($TH_3$) 106. After each test harness is executed corresponding test results are generated. As shown, physically, for each test harness a corresponding set of test results is illustrated: (1) $TH_1$ 102 corresponds to Test Result 1 ($TR_{F1}$) 108, (2) test harness 2 104 corresponds to Test Result 2 ($TR_{F2}$) 110, and (3) test harness 3 corresponds to Test Result 3 ($TR_{F3}$) 112. The data within each set of results has an associated test format indicated by the subscript. However, in this example the sets of test results overlap, sharing formats across a boundary. This is illustrated with the piece of data $TR_X$ 114 carved out between $TR_{F2}$ 110 and $TR_{F3}$ 112. $TR_X$ is composed of test data in Format 2 and Format 3.

Figure 2:
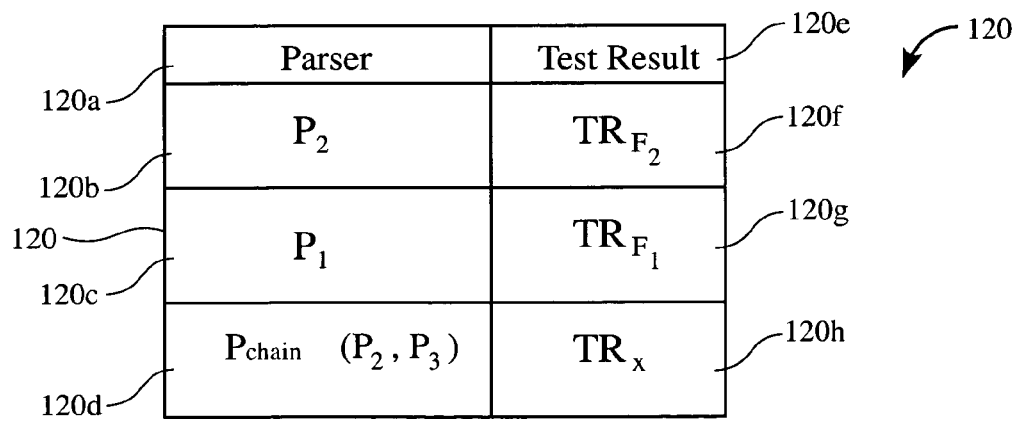
FIG. 2 is a block diagram illustrating a selection of a set of parsers and corresponding test result formats, in accordance with one embodiment of the present invention.
Figure 3:
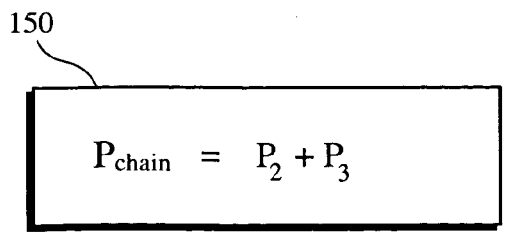
FIG. 3 is a diagram illustrating a parser chain, in accordance with one embodiment of the present invention.

After the test results are generated they must be parsed. Reference is now made to FIG. 2 illustrating a block diagram of selection of a set of parsers and corresponding test result formats, in accordance with one embodiment of the present invention. As shown, Table 120 includes a column of parsers titled Parser 120a and a second column of corresponding test result formats labeled Test Result 120e. The first entry under the Parser 120e column is $P_2$ 120b. The first entry under the Test Result 120e column is $TR_{F2}$ 120f. $TR_{F2}$ 120f can be parsed by $P_2$ 120b as they are of a corresponding format. The second entry under the Parser 120e column is $P_1$ 120c. The second entry under the Test Result 120e column is $TR_{F1}$ 120g. $TR_{F1}$ 120g can be parsed by $P_1$ 120c as they are of the same format. The final row of table 120 provides the test result format TRx 120h. This, as seen in FIG. 1 corresponds to a hybrid of formats, it is a combination of $TR_{F1}$ and $TR_{F2}$. Traditionally, a set of data corresponding to more than one test result format could not be parsed by one parser of one format, however embodiments of this invention provide for the chaining of parsers of more than one format, see for example the last entry in the Parser 120a column which contains $P_{chain}$ (P2, P3) 120d. This parser chain, as illustrated in FIG. 3, contains parsers of both Format 2 and Format 3: $P_{chain}=(P_2+P_3)$ 150, therefore it can parse test results of both $TR_{F2}$ and $TR_{F3}$. Parser chains will be more fully discussed in the following figures.

Figure 4:
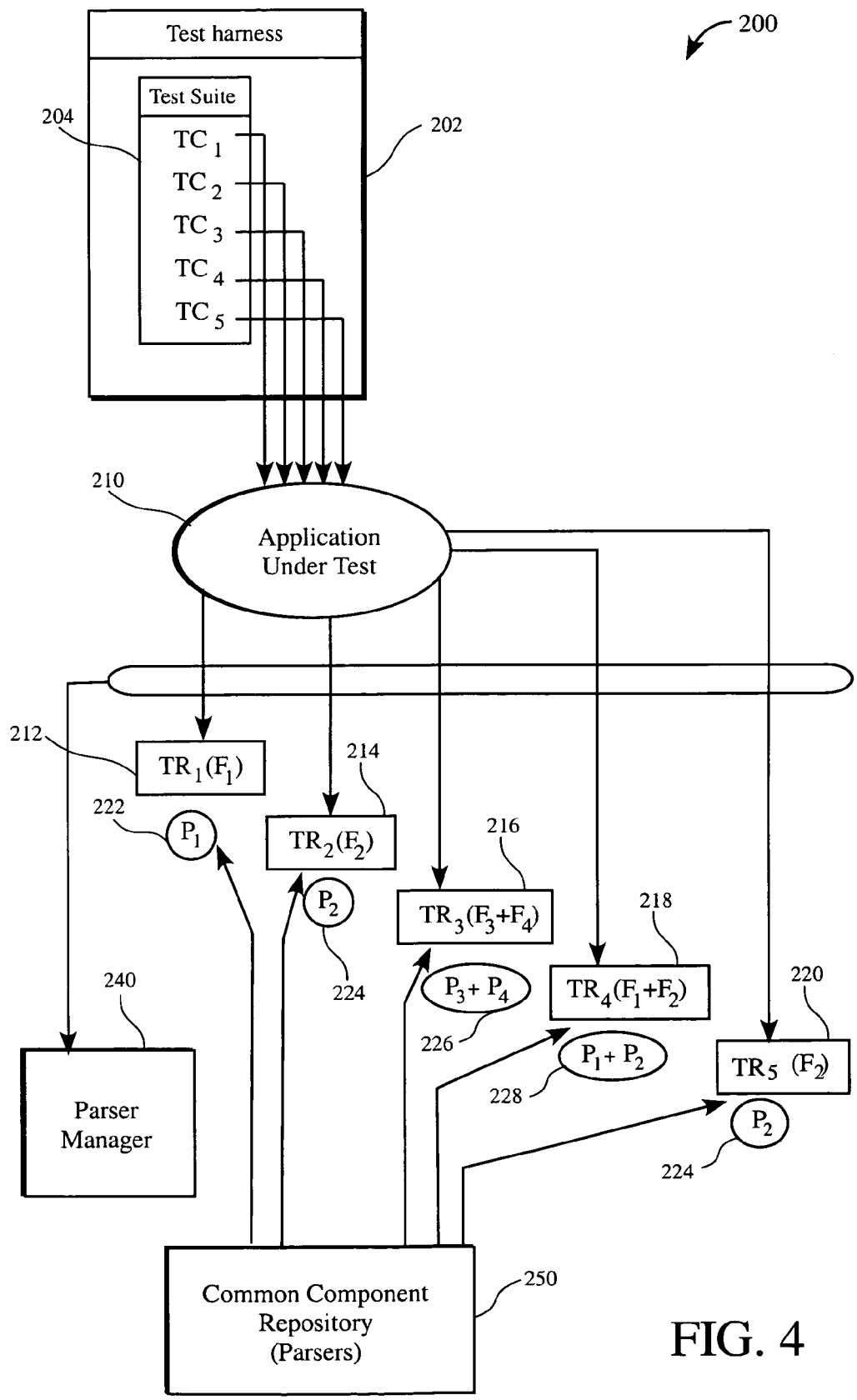
FIG. 4 is a block diagram showing the execution of the parsing process on a set of test results of different formats from a test harness, in accordance with one embodiment of the present invention.

Reference is made to a block diagram depicted in FIG. 4 illustrating the execution of the parsing process on a set of test results of different formats from a test harness, in accordance with one embodiment of the present invention.

The test harness 202 contains a test suite 204. The test suite 204 contains a series of test cases; $TC_1$, $TC_2$, $TC_3$, $TC_4$, and $TC_5$. As used herein, a test suite is a comprehensive list of data files having commands specifically programmed to initiate a number of functional aspects of the software product being tested. For instance, if the software product being tested is an e-commerce program, the test suite may activate a select command, a sort command, a print command, etc. The test cases are executed in the Application under test section 210. Once the test suite is submitted for processing and executed, the test results reveal whether any of the tested commands failed to operate as intended. Each Test Case (TC) has a corresponding Test Result. Test Case 1 ($TC_1$) corresponds to $TR_1(F_1)$ 212 where $TR_1(F_1)$ 212 is defined as Test Result 1 in the format 1. Test Case 2 ($TC_2$) corresponds to $TR_2(F_2)$ 214, which is Test Result 2, in format 2. Test Case 3 ($TC_3$) corresponds to $TR_3(F_3+F_4)$ 216 which is Test Result 3, in format 3 and format 4. Test Case 4 ($TC_4$) corresponds to $TR_4(F_1+F_2)$ 218 which is Test Result 4, in format 1 and format 2. Test Case 5 ($TC_5$) corresponds to $TR_5(F_2)$ 220 which is Test Result 4, in format 2.

Figure 5:
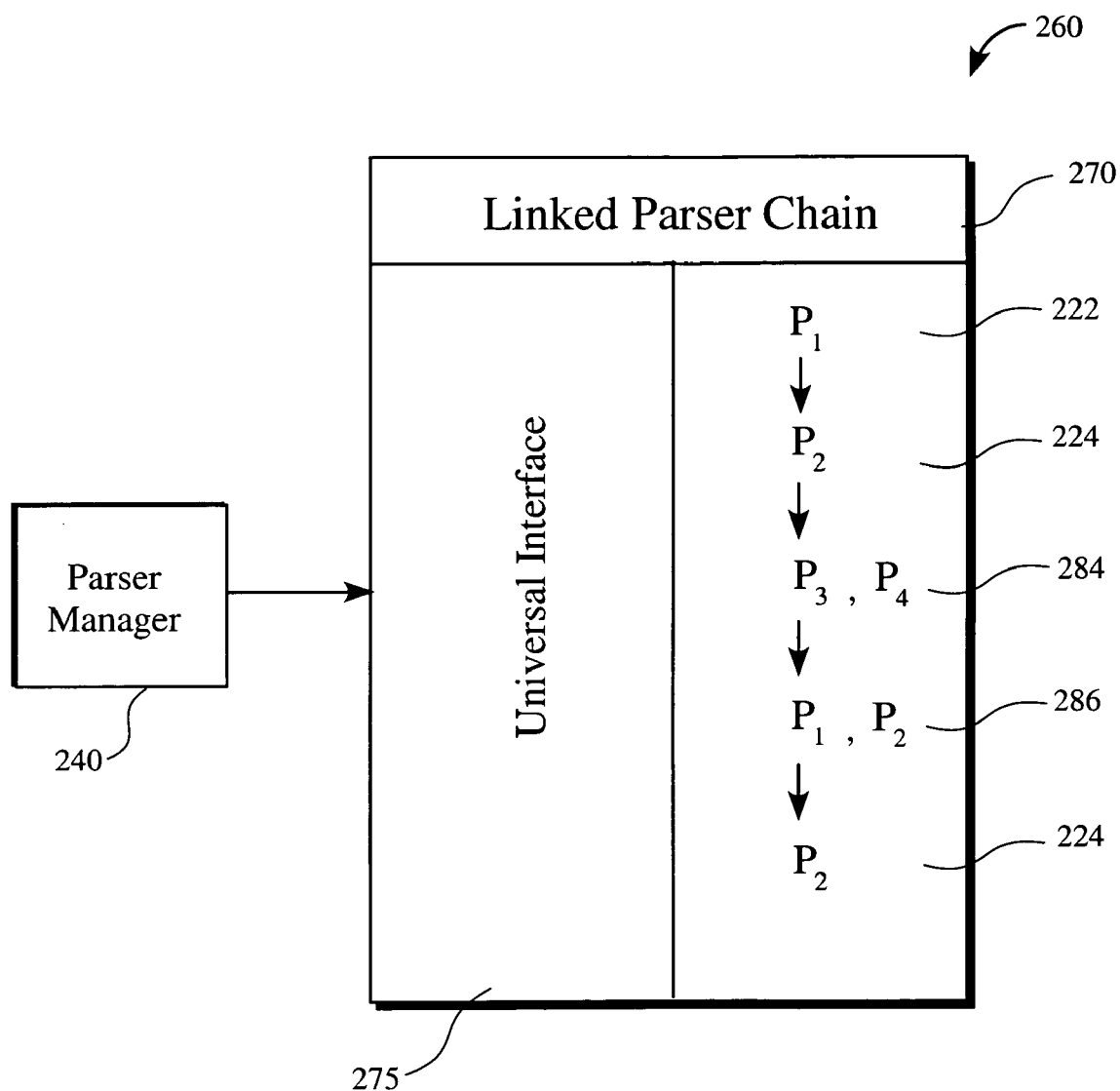
FIG. 5 is a block diagram showing a linked parser chain with an associated universal interface and an associated parser manager, in accordance with one embodiment of the present invention.

After these test results are generated they must be parsed. The parser manager 240 is used to determine which test result formats are present and in what order. The parser manager 240 can then access the common component repository 250, which contains all the necessary parsers. Reference is now also made to FIG. 5. FIG. 5 is a block diagram showing a linked parser chain with an associated universal interface and an associated parser manager, in accordance with an embodiment of the present invention. As illustrated in process 260, the parser manager 240 with the information discussed above, creates a linked parser chain 270. The linked parser chain creates a chain of parsers that have all of the formats of the test results generated from a test suite 204 as found in FIG. 4. As discussed above each different test format requires a parser of a specific format, so the test results in FIG. 4 require parsers for the five test results $TR_1(F_1)$ 212, $TR_2(F_2)$ 214, $TR_3(F_3+F_4)$ 216, $TR_4(F_1+F_2)$ 218, and $TR_5(F_2)$ 220. So for each different format a different parser is needed. As seen in FIG. 4, $TR_1(F_1)$ 212 is parsed by a parser of format 1, $P_1$ 222. $TR_2(F_2)$ 214 is parsed by a parser of format 2, $P_2$ 224. $TR_3(F_3+F_4)$ 216 is parsed by a parser chain of format 3 and format 4, $P_3+P_4$ 226. $TR_4(F_1+F_2)$ 218 is parsed by a parser chain of format 1 and format 2, $P_1+P_2$ 228. Finally, $TR_5(F_2)$ 220 is parsed by a parser of format 2, $P_2$ 224. The parser manager 240 creates a linked parser chain 270 corresponding to the parsers needed by the test formats described above, and stores it in memory until it is needed for parsing.

In one embodiment, because the parser chain is generated automatically, a software engineer would not be required to manually generate shell scripts of parsers to individually parse different test result formats. In summary, the parser chain is automatically generated and each individual parser will execute its task followed by the next parser in the chain and the next until each parser has completed its task.

As seen in detail in FIG. 5, the linked parser chain is constructed in an order corresponding to the target set of test results (from for example FIG. 4) to be parsed and is read and managed by the parser manager 240. The linked parser chain 270 is composed of the following parsers and parser chains: $P_1$ 220; $P_2$ 224; $P_3$, $P_4$ 284; $P_1$, $P_2$ 286, and finally $P_2$ 224. This parser chain is linked using a universal interface 275. The parsers are connected across the chain and are able to access other parsers in the same chain, thus facilitating parsing of test results of different formats. As each parser is needed it is called through the universal interface to define the chain and applied to the test results. Accordingly, each individual parser in the chain will execute its task on a given test result followed by execution of the next parser in the chain and the next until all tasks in the chain have been completed.

Exemplary code for processing the chained parsing is provided in the following tables. The result parsers (loggers), meta-parser (meta-logger) and the universal interface for result data are provided in the following Tables 1–3, respectively.

In Table 1 below the code for the MetaLogger interface is provided.

TABLE 1

```
package com.sun.jsd.jpr.ccr.reslog;
public interface MetaLogger {
    /**
     * Methods for initialization and un-installation of loggers
     */
    public void initLoggers( );
    public void closeLoggers( );
    /**
     * Methods to work Loggers properties: get variables and values
     */
    public Object getLoggerProperty(String key);
    public Object[] getPropertes( );
    /**
     * Logger's manipulation methods: add && remove
     */
    public void addLogger(ResultLogger loger);
    public void addLogger(String className) throws Exception;
    public void removeLogger(ResultLogger logger);
    public void removeLogger(String key);
    /**
     * To Process ResultData object
     */
    public void processData(ResultData data);
}
```

In Table 2 below, the code for the ResultLogger interface is provided.

TABLE 2

```
package com.sun.jsd.jpr.ccr.reslog;
public interface ResultLogger {
   /**
    * Method sets main Logger (mainly is set to obtain variables) and init
    * Logger operations called ones, before it gets added to chain. The Logger
    * Will not be added if Exception is thrown
    */
   public void initLogger (MetaLogger mLogger) throws Exception;
   /**
    * Method ought to be called when there is a data in queue that needed to
    * be processed
    */
   public void processData (ResultData data, ResultLogger prevLogger);
   /**
    * Method called to remove logger from chain
    */
   public void closeLogger( );
   /**
    * Method allows to take data from prev Logger
    */
   public Object getProcessedData( );
   /**
    * These two methods are serve Logger identification if any implemented
    */
   public void setIdentKey (String str);
   public boolean hasIdentKey (String str);
}
```

In Table 3 below, the code for the ResultData, the universal interface is provided.

TABLE 3

```
package com.sun.jsd.jpr.ccr.reslog;
public interface ResultData {
   /**
    * Method to get named property from ResultData object
    */
   public Object getProperty(String key);
   /**
    * Method returns array includes properties' keys of ResultData
    *   object
    */
   public Object[] getPropertyKeys( );
   /**
    * Method returns array includes properties of ResultData object
    */
   public Object[] getProperties( );
}
```

Figure 6:
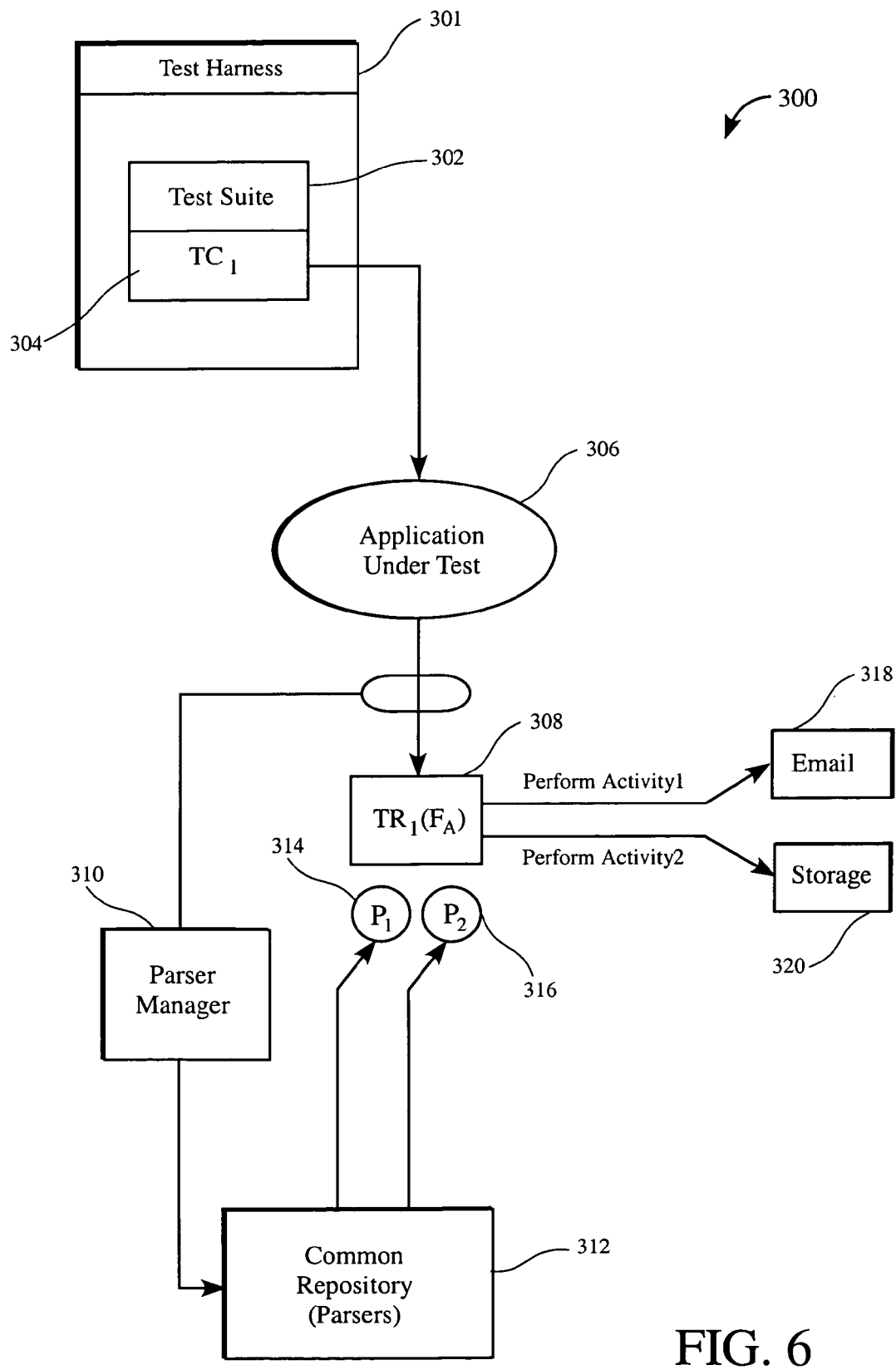
FIG. 6 is a block diagram showing the execution of two different parsing processes on one set of test results of a common format so that two different activities can be performed on the results, in accordance with one embodiment of the present invention.

Reference is now made to a block diagram depicted in FIG. 6 showing the execution of two different parsing processes on one set of test results of a common format so that two different actions can be performed on the test results, in accordance with an embodiment of the present invention.

The test harness 301 contains a test suite 302. The test suite 302 contains a test case: $TC_1$ 304. The test case $TC_1$ 304 is executed on the Application under test 306. Once the test suite is submitted for processing and executed, the test results reveal whether any of the tested commands failed to operate as intended. The test case $TC_1$ 304 has a corresponding Test Result $TR_1(F_A)$ 308. $TR_1(F_A)$ 308 is defined as Test Result 1 in the format A. Here the test result $TR_1(F_A)$ 308 is of only one format, however the objective is to parse the test result in two different ways to perform two separate and different activities on the same data, such as sending as email 318 and saving to storage 320. The parser manager 310 accesses the common repository (parsers) 312, which contains all of the necessary parsers. The parser manager then applies parser one, P1 314, which will parse $TR_1(F_A)$ 308 in such a manner that the parsed results can be emailed. The parser manager will also applies parser two, P2 316, which will parse in such a manner that the parsed results can be stored.

Figure 7:
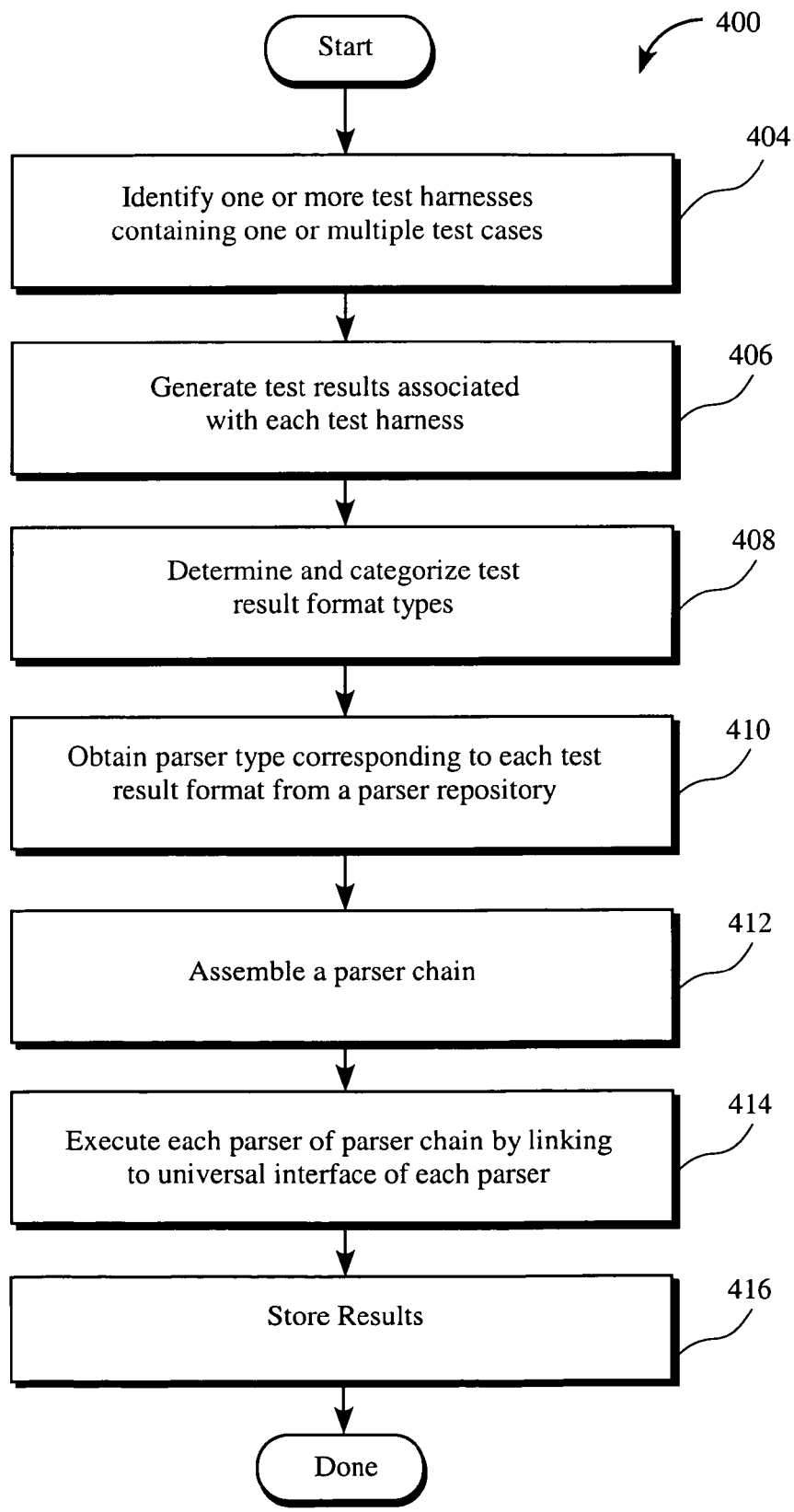
FIG. 7 is a flowchart showing a method for parsing test results having diverse formats, in accordance with one embodiment of the present invention.

FIG. 7 is a flowchart showing method 400 for parsing test results having diverse formats, in accordance with an embodiment of the present invention. The method begins at operation 404, where one or more test harnesses containing one or multiple test cases is identified. Next in operation 406, for each test harness associated test results are generated. Then moving on to operation 408 the format types of the test results are determined and categorized. Next in operation 410, a parser type corresponding to each test result format is obtained from a parser repository. Then moving on to operation 412, a parser chain is assembled. Next in operation 414, each parser of the parser chain is executed on the test results. This is done by linking to the universal interfaces of each parser. Finally, in operation 416 the parsed results are stored. After operation 416, the method is done.

Figure 8:
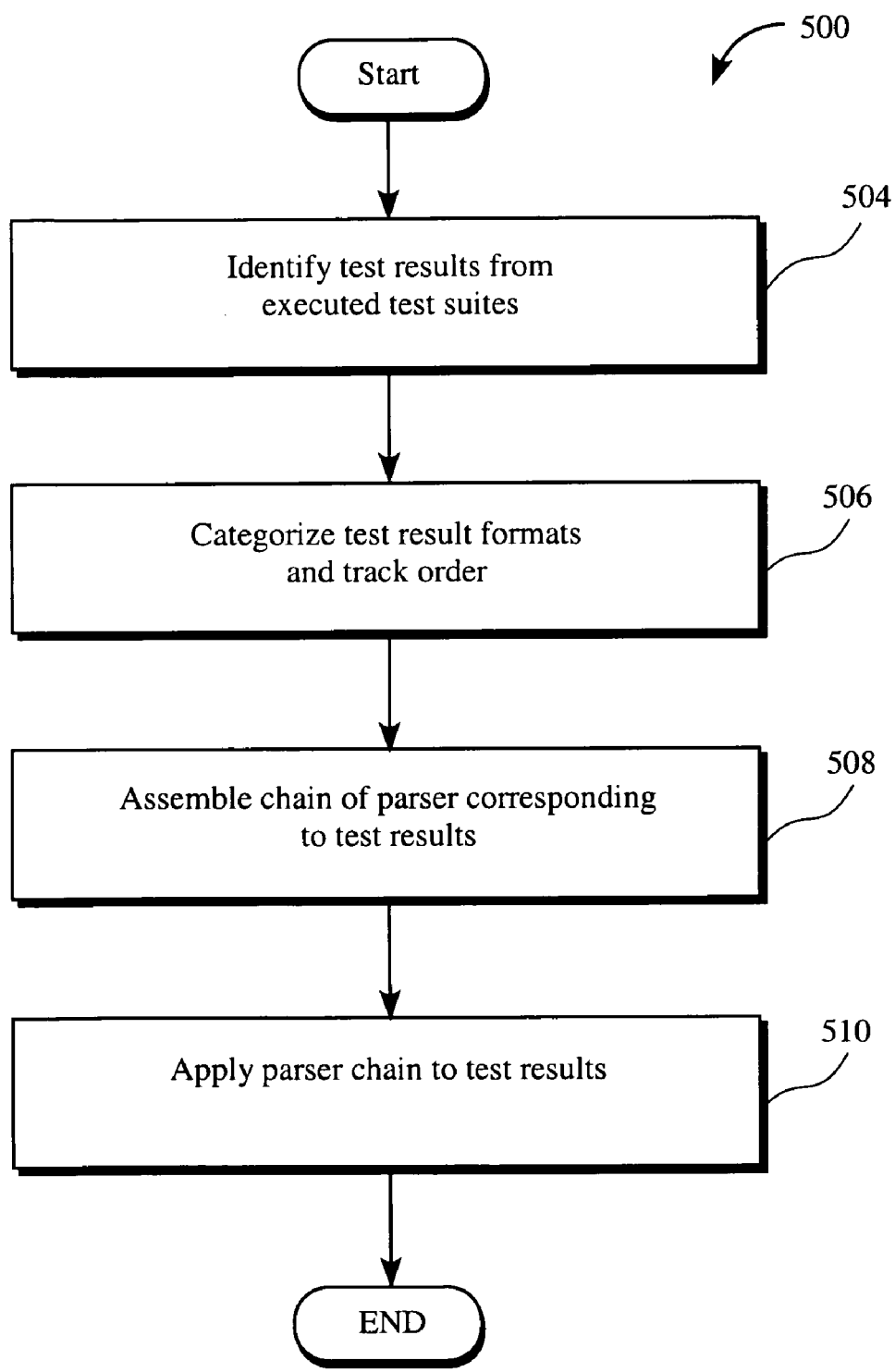
FIG. 8 is a diagram showing a method for parsing test results having diverse formats, in accordance with one embodiment of the present invention.

FIG. 8 is a flowchart showing method 500 for parsing test results having diverse formats, in accordance with an embodiment of the present invention. The method begins at operation 504, test results from executed test suites are identified. Next in operation 506, the formats of the test results are categorized and the order is tracked. In operation 508, a chain of parsers is assembled corresponding to the test results. Next in operation 510, a chain of parsers is applied to the test results. After operation 510, the method ends. The linked parser chain is constructed in an order corresponding to the target set of test results (from for Example FIG. 4) to be parsed and is read and managed by the parser manager. The linked parser chain is composed of the parsers and parser chains. This parser chain is linked by a universal interface. The parsers are connected across the chain and are able to access other parsers in the same chain, thus facilitating parsing of test results of different formats.

Although the flowchart operations have been described in a particular order, it should be understood that the order of execution may differ. In one example, the order of execution may proceed in parallel or serially depending on the specific algorithm and hardware implementation. In another example, the order of the functional operations may be rearranged.

Further, the above described invention has been described in the general context of an application program that is executed on an operating system in conjunction with a test system, it should be appreciated that the invention may be implemented with other routines, programs, components, data structures, etc., which perform particular tasks or implement particular abstract data types. Furthermore, the invention may be practiced with other computer system configurations including hand-held devices, microprocessor systems, microprocessor-based or programmable consumer electronics, minicomputers, mainframe computers and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for parsing test results having diverse formats, comprising:
   identifying a set of test results from executed test suites, wherein the set of test results include multiple test result formats, each test result format associated with a different parser;
   automatically determining an order in which the multiple test result formats occur in the entire set of test results;
   automatically generating a chain of parsers to parse the entire set of test results, wherein the chain of parsers includes multiple parsers sequentially linked such that an order of the test formats respectively associated with the multiple parsers corresponds to the order in which the multiple test result formats occur in the set of test results; and
   applying the chain of parsers to parse the entire set of test results.

2. A method as recited in claim 1, wherein the chain of parsers is defined from individual parsers and each individual parser is charged with parsing a particular test result format.

3. A method as recited in claim 1, wherein parsing the set of test results by applying the chain of parsers identifies data features that define attributes of the set of test results.

4. A method as recited in claim 3, wherein the attributes define pass, fail, or comments associated with the pass or fail.

5. A method as recited in claim 1, wherein applying the chain of parsers includes executing each parser in the chain of parsers by linking to a universal interface of each parser to obtain parsing results.

6. A method for parsing test results having diverse formats, comprising: executing a test harness containing a plurality of test cases to generate a plurality of test results, wherein the plurality of test results are generated in a plurality of test result formats;
   automatically determining an order in which the plurality of test result formats occur in the plurality of test results;
   automatically generating a chain of parsers including a plurality of parsers sequentially linked such that an order test result formats associated with the plurality of parsers corresponds to the determined order in which the plurality of test formats occur in the plurality of test results, the plurality of parsers in the chain of parsers configured to be interconnected through a universal interface such that each parser in the chain of parsers is able to access other parsers in the chain of parsers.

7. A method as recited in claim 6, further comprising: linking the chain of parsers with the universal interface.

8. A method as recited in claim 6, wherein the chain of parsers is defined from individual parsers, and each individual parser is charged with parsing a particular test result format.

9. A method as recited in claim 6, further comprising:
   applying the chain of parsers to parse the plurality of test results, wherein parsing the plurality of test results identifies data features that define attributes of the test results.

10. A method as recited in claim 9, wherein the attributes define pass, fail, or comments associated with the pass or fail.

11. A method as recited in claim 6, further comprising:
   obtaining parser types corresponding to each test result format type from a parser repository.

12. A computer program embodied on a computer readable medium to parse test results having diverse formats, comprising:
   a code segment that identifies a set of test results from executed test suites, wherein the set of test results include multiple test result formats, each test result format associated with a different parser;
   a code segment that determines an order in which the multiple test result formats occur in the entire set of test results;
   a code segment that generates a chain of parsers to parse the entire set of test results, wherein the chain of parsers includes multiple parsers sequentially linked such that an order of the test formats respectively associated with the multiple parsers corresponds to the order in which the multiple test result formats occur in the set of test results; and a code segment that applies the chain of parsers to parse the entire set of test results.

13. A computer program as recited in claim 12, further comprising:

a code segment that links the chain of parsers with a universal interface.

14. A computer program as recited in claim 12, further comprising:

a code segment to present the test results in a unifying test result format.

15. A computer program as recited in claim 14, wherein the unifying format is an Extensible Markup Language (XML).

16. A computer program as recited in claim 15, wherein the XML format is read and presented on a user screen using an XML Style Sheet Language: Transformations (XSLT).

* * * * *